US012629814B2

(12) United States Patent
Li et al.

(10) Patent No.: US 12,629,814 B2
(45) Date of Patent: May 19, 2026

(54) MATERIAL TRANSFERRING METHOD, WAREHOUSE MANAGEMENT DEVICE, WAREHOUSING SYSTEM, MEDIUM, AND PRODUCT

(71) Applicants: HAI ROBOTICS CO., LTD., Shenzhen (CN); BEIJING JINGXUNDI TECHNOLOGY CO., LTD., Daxing District Beijing (CN)

(72) Inventors: Bao Li, Shenzhen (CN); Hongxia Zhou, Shenzhen (CN); Xin Ai, Shenzhen (CN); Kun Wang, Shenzhen (CN); Zhixing Yang, Daxing District Beijing (CN); Jie Qiu, Daxing District Beijing (CN); Meng Chen, Daxing District Beijing (CN); Bin Zhang, Shenzhen (CN)

(73) Assignees: HAIROBOTICS CO., LTD., Shenzhen (CN); BEIJING JINGXUNDI TECHNOLOGY CO., LTD., Beijing (CN)

( * ) Notice: Subject to any disclaimer, the term of this patent is extended or adjusted under 35 U.S.C. 154(b) by 534 days.

(21) Appl. No.: 18/342,900

(22) Filed: Jun. 28, 2023

(65) Prior Publication Data

US 2023/0339686 A1 Oct. 26, 2023

Related U.S. Application Data

(63) Continuation of application No. PCT/CN2021/139808, filed on Dec. 20, 2021.

(30) Foreign Application Priority Data

Dec. 31, 2020 (CN) .......................... 202011642137.9

(51) Int. Cl.
*B25J 9/00* (2006.01)
*B25J 9/16* (2006.01)
(Continued)

(52) U.S. Cl.
CPC .......... *B25J 9/0093* (2013.01); *B25J 9/1679* (2013.01); *B65G 1/0485* (2013.01);
(Continued)

(58) Field of Classification Search
CPC ..... B25J 9/0093; B25J 9/1679; B65G 1/0485; B65G 1/0492; B65G 1/1376;
(Continued)

(56) References Cited

U.S. PATENT DOCUMENTS 11,498,766 B2 * 11/2022 Zhou ..................... B65G 1/1373
2002/0179502 A1 12/2002 Cerutti et al.
(Continued)

FOREIGN PATENT DOCUMENTS

CN 1736824 A 2/2006
CN 106743029 A 5/2017
(Continued)

OTHER PUBLICATIONS

International Search Report for PCT/CN2021/139808.
(Continued)

*Primary Examiner* — Thomas Randazzo
(74) *Attorney, Agent, or Firm* — Ladas & Parry, LLP

(57) ABSTRACT

A material transferring method includes: controlling a first robot transferring materials to move to a first entrance of the M entrances; and controlling the first robot to place a first quantity of materials at the first entrance, the first quantity being less than or equal to a second quantity. The first entrance is one of the M entrances that is in an idle state. The
(Continued)

second quantity is a total quantity of materials to be placed on the conveyor line by the first robot.

20 Claims, 9 Drawing Sheets

(51) Int. Cl.
*B65G 1/04* (2006.01)
*B65G 1/137* (2006.01)
*G06Q 10/087* (2023.01)

(52) U.S. Cl.
CPC ......... *B65G 1/0492* (2013.01); *B65G 1/1376* (2013.01); *G06Q 10/087* (2013.01)

(58) Field of Classification Search
CPC .......... B65G 2203/0241; B65G 1/1371; G06Q 10/087; Y02P 90/02
See application file for complete search history.

(56) References Cited

U.S. PATENT DOCUMENTS

| | | | | |
|---|---|---|---|---|
| 2011/0048894 | A1* | 3/2011 | Doane | B65G 47/506 198/460.1 |
| 2016/0280461 | A1 | 9/2016 | Geiger et al. | |
| 2018/0229948 | A1* | 8/2018 | Kollmuss | B65G 57/06 |

FOREIGN PATENT DOCUMENTS

| | | | | | |
|---|---|---|---|---|---|
| CN | 206265691 | U | | 6/2017 | |
| CN | 108657705 | A | | 10/2018 | |
| CN | 108750521 | A | | 11/2018 | |
| CN | 109178749 | A | | 1/2019 | |
| CN | 109492934 | A | | 3/2019 | |
| CN | 109656243 | A | | 4/2019 | |
| CN | 109941660 | A | | 6/2019 | |
| CN | 109987366 | A | | 7/2019 | |
| CN | 110040412 | A | | 7/2019 | |
| CN | 110084471 | A | | 8/2019 | |
| CN | 110092158 | A | | 8/2019 | |
| CN | 110239870 | A | | 9/2019 | |
| CN | 110348749 | A | | 10/2019 | |
| CN | 110404830 | A | | 11/2019 | |
| CN | 110428197 | A | | 11/2019 | |
| CN | 110550359 | A | | 12/2019 | |
| CN | 110598928 | A | | 12/2019 | |
| CN | 110633938 | A | | 12/2019 | |
| CN | 110844428 | A | | 2/2020 | |
| CN | 110874673 | A | | 3/2020 | |
| CN | 111038903 | A | | 4/2020 | |
| CN | 111186682 | A | | 5/2020 | |
| CN | 111284981 | A | | 6/2020 | |
| CN | 111724015 | A | | 9/2020 | |
| CN | 211495520 | U | | 9/2020 | |
| CN | 111731731 | A | | 10/2020 | |
| CN | 111792260 | A | | 10/2020 | |
| CN | 111977244 | A | | 11/2020 | |
| CN | 112830147 | A | | 5/2021 | |
| CN | 215477489 | U | * | 1/2022 | .............. B65G 1/04 |
| CN | 115092595 | A | * | 9/2022 | ............ B65G 1/137 |
| CN | 4574712 | A1 | * | 6/2025 | .......... B65G 1/0485 |
| JP | 2005231792 | A | | 9/2005 | |
| JP | 2019189463 | A | | 10/2019 | |
| WO | WO2015007513 | A1 | | 1/2015 | |
| WO | WO2019154445 | A2 | | 8/2019 | |

OTHER PUBLICATIONS

First Office Action of counterpart Japanese Patent Application No. 2023-540767 issued on Jul. 23, 2024.
First Office Action of counterpart Chinese Patent Application No. 202211035416.8 issued on Jan. 27, 2025, with search report.

* cited by examiner

MATERIAL TRANSFERRING METHOD, WAREHOUSE MANAGEMENT DEVICE, WAREHOUSING SYSTEM, MEDIUM, AND PRODUCT

CROSS-REFERENCE TO RELATED APPLICATIONS

This application is a continuation of International Patent Application No. PCT/CN2021/139808 filed on Dec. 20, 2021, which claims priority to Chinese Patent Application No. 202011642137.9, entitled "MATERIAL TRANSFERRING METHOD, WAREHOUSE MANAGEMENT DEVICE, WAREHOUSING SYSTEM, MEDIUM, AND PRODUCT" and filed with the National Intellectual Property Administration, PRC on Dec. 31, 2020, which are incorporated herein by reference in their entirety.

TECHNICAL FIELD

This application relates to the field of intelligent warehousing technologies, and in particular, to a material transferring method, a warehouse management device, a warehousing system, a medium, and a product.

BACKGROUND

A warehouse in which materials are stored is generally provided with a conveyor line for transferring the materials. The conveyor line may drive the materials to move, so as to facilitate workbenches located at different positions in the warehouse to handle the materials.

In the related art, according to material transferring directions of the conveyor line, the conveyor line is generally provided with one/a plurality of entrances and one/a plurality of exits, and robots can go to the entrance(s) to place the materials (place the materials fetched from a shelf on the conveyor line), or go to the exit(s) to fetch the materials (fetch the materials from the conveyor line and put the materials back on the shelf). An action path of the robots is generally set as entry into a conveyor line region from the entrance(s) and then departure from the conveyor line region from the exit(s).

In existing control logic, when going to an entrance position to place materials, a robot generally places all the materials handled on the conveyor line at one time. However, if a quantity of materials placed by all robots exceeds a quantity of materials that can be placed on the conveyor line, the robot cannot perform a material placement action. In this case, the robot needs to wait for other robots to fetch the materials from the conveyor line to obtain a new material placement position before continuing to place the materials. During the waiting, mutual congestion of the robots easily occurs, thereby reducing efficiency of material transferring performed by the robots.

SUMMARY

This application provides a material transferring method, a warehouse management device, a warehousing system, a medium, and a product, which can form a good cycle for robots to smoothly place materials and smoothly fetch the materials, thereby preventing congestion of the robots and avoiding lockup of a conveyor line.

In a first aspect, this application provides a material transferring method, applied to a warehouse management device, where a conveyor line includes M entrances and N exits, where $M \geq 1$, $N \geq 1$, and M and N are both integers; and the method includes:

controlling a first robot transferring materials to move to a first entrance of the M entrances, the first entrance being one of the M entrances that is in an idle state; and controlling the first robot to place a first quantity of materials at the first entrance, the first quantity being less than or equal to a second quantity, the second quantity being a total quantity of materials to be placed on the conveyor line by the first robot.

In some embodiments, when the conveyor line includes at least two entrances, the method further includes:

determining the first quantity.

In some embodiments, the determining the first quantity includes:

determining that the first quantity is equal to the second quantity when the first entrance is an entrance closest to a workbench; and determining the first quantity according to a third quantity, a fourth quantity, and a fifth quantity when the first entrance is one of the M entrances except the entrance closest to the workbench;

where the third quantity is a quantity of materials to be placed by robots at a second entrance of the M entrances except the first entrance, and a distance between the second entrance and the workbench is less than that between the first entrance and the workbench;

the fourth quantity is a quantity of materials available for current placement on the conveyor line; and the fifth quantity is a total quantity of materials available for current fetching by robots at the N exits.

In some embodiments, the determining the first quantity according to a third quantity, a fourth quantity, and a fifth quantity includes:

obtaining the first quantity through the following formula:

$$N1 = N4 + N5 - N3$$

where N1 denotes the first quantity, N3 denotes the third quantity, N4 denotes the fourth quantity, and N5 denotes the fifth quantity.

In some embodiments, when the conveyor line includes one entrance, the first quantity is equal to the second quantity.

In some embodiments, the controlling first robots transferring materials to move to a first entrance of the M entrances includes:

determining, when the M entrances include at least two idle entrances, that one of the at least two idle entrances that is closest to the workbench is the first entrance; and controlling the first robot to move to the first entrance.

In some embodiments, the method further includes:

before the first robot finishes placing all the materials to be placed on the conveyor line, controlling, if there is a third entrance, the first robot to move to the third entrance and place the remaining materials to be placed at a position of the third entrance;

where the third entrance is one of the M entrances that is in an idle state, and a distance between the third entrance and the workbench is less than that between the first entrance and the workbench.

In some embodiments, the method further includes:

controlling the first robot to move to a first exit of the N exits when the first robot finishes placing all the materials to be placed on the conveyor line, the first exit being one of the N exits that is in an idle state; and controlling the first robot to fetch, at a position of the first exit, the materials handled by the workbench from the conveyor line.

In some embodiments, the controlling the first robot to move to a first exit of the N exits includes:

determining, when the N exits include at least two idle exits, that one of the at least two idle exits that is farthest from the workbench is the first exit; and controlling the first robot to move to the first exit.

In some embodiments, the controlling the first robot to move to a first exit of the N exits includes:

controlling, when second robots exist at all the N exits, the second robots to leave the corresponding exits to obtain the first exit; and controlling the first robot to move to the first exit.

In some embodiments, the controlling the second robots to leave the corresponding exits to obtain the first exit includes:

controlling the second robot at the exit farthest from the workbench to leave to obtain the first exit.

In some embodiments, the method further includes:

when a quantity of materials fetched by the first robot at the position of the first exit does not reach a maximum quantity of materials stored by the first robot, if there is a second exit, controlling the first robot to move to the second exit and fetch, at a position of the second exit, materials handled by the workbench;

where the second exit is one of the N exits that is in an idle state, and a distance between the second exit and the workbench is greater than that between the first exit and the workbench.

In some embodiments, when the conveyor line includes at least two entrances, the method further includes:

controlling the conveyor line to preferentially convey the materials placed by the first robot at the entrance closest to the workbench.

In some embodiments, the controlling the conveyor line to preferentially convey the materials placed by the first robot at the entrance closest to the workbench includes:

controlling the conveyor line to convey materials on a first conveying path to the workbench; and during the controlling the conveyor line to convey materials on a first conveying path to the workbench, controlling the conveyor line to suspend conveying materials on a second conveying path until there are no materials on the first conveying path or a quantity of the materials on the first conveying path is less than a maximum conveying quantity of the materials on the first conveying path;

where the first conveying path is a path for the conveyor line to convey the materials placed by the first robot at the entrance closest to the workbench to the workbench; and the second conveying path is a path for the conveyor line to convey the materials placed by the first robot at one of the M entrances except the entrance closest to the workbench to the workbench.

In some embodiments, the controlling the conveyor line to preferentially convey the materials placed by the first robot at the entrance closest to the workbench includes:

controlling the conveyor line to convey materials on a third conveying path to the workbench; and controlling the conveyor line to convey a sixth quantity of materials on a fourth conveying path to the workbench, the sixth quantity being less than a total quantity of materials on the fourth conveying path, the sixth quantity being determined according to a seventh quantity, an eighth quantity, and a ninth quantity;

where the third conveying path is a path for the conveyor line to convey the materials placed by the first robot at the entrance closest to the workbench to the exits;

the fourth conveying path is a path for the conveyor line to convey the materials placed by the first robot at one of the M entrances except the entrance closest to the workbench to the exits;

the seventh quantity is a total quantity of materials on the third conveying path;

the eighth quantity is a quantity of materials available for current placement on the third conveying path; and the ninth quantity is a total quantity of materials available for current fetching by robots at the N exits.

In some embodiments, when the conveyor line includes at least two exits, the method further includes:

controlling the conveyor line to preferentially convey the materials handled by the workbench to the exit farthest from the workbench.

In a second aspect, this application provides a warehouse management device, including:

at least one processor; and a memory in communication connection with the at least one processor;

where the memory stores instructions executable by the at least one processor, the instructions, when executed by the at least one processor, causing the warehouse management device to perform the foregoing method.

In a third aspect, this application provides a warehousing system, including the foregoing warehouse management device and robots controlled by the warehouse management device;

the robots including first robots and second robots;

the first robots being configured to handle materials loaded with materials to a conveyor line; and the second robots being configured to fetch materials handled by a workbench from the conveyor line.

In a fourth aspect, this application further provides a computer-readable storage medium, where the computer-readable storage medium stores computer executable instructions, and the computer executable instructions, when executed by a processor, are configured to implement the foregoing material transferring method.

In a fifth aspect, this application provides a computer program product, including a computer program, and the computer program, when executed by a processor, implements the foregoing material transferring method.

In the material transferring method, the warehouse management device, the warehousing system, the medium, and the product according to this application, the method includes: controlling a first robot transferring materials to move to a first entrance of the M entrances, the first entrance being one of the M entrances that is in an idle state; and controlling the first robot to place a first quantity of materials at the first entrance, the first quantity being less than or equal to a second quantity, the second quantity being a total quantity of materials to be placed on a conveyor line by the first robot. During placement of materials by robots, the warehouse management device may control a quantity of the materials placed by the robots. That is, the warehouse management device may control the first robot to place all or part of the materials loaded therein, so that the first robot can place different quantities of materials at different first entrances to balance a material carrying capacity on a conveying path corresponding to each entrance. Therefore, a good cycle for the robots to smoothly place the materials and smoothly fetch the materials can be formed, thereby preventing congestion of the robots and lockup of the conveyor line.

BRIEF DESCRIPTION OF THE DRAWINGS

Accompanying drawings herein are incorporated into and constitute a part of this specification, show embodiments that conform to this application, and are used together with this specification to describe the principle of this application.

The foregoing accompanying drawings illustrate specific embodiments of this application, and more detailed description is provided below. The accompanying drawings and text descriptions are not intended to limit the scope of the idea of this application in any manner, but are intended to describe the concept of this application to a person skilled in the art with reference to particular embodiments.

DETAILED DESCRIPTION

Exemplary embodiments are described in detail herein, and examples thereof are shown in the accompanying drawings. When the following descriptions are made with reference to the accompanying drawings, unless otherwise indicated, the same numbers in different accompanying drawings represent the same or similar elements. The following implementations described in the following exemplary embodiments do not represent all implementations that are consistent with this application. Instead, they are merely examples of the apparatus and method according to some aspects of this application as recited in the appended claims.

Application scenarios of embodiments of this application are described below.

Figure 1:
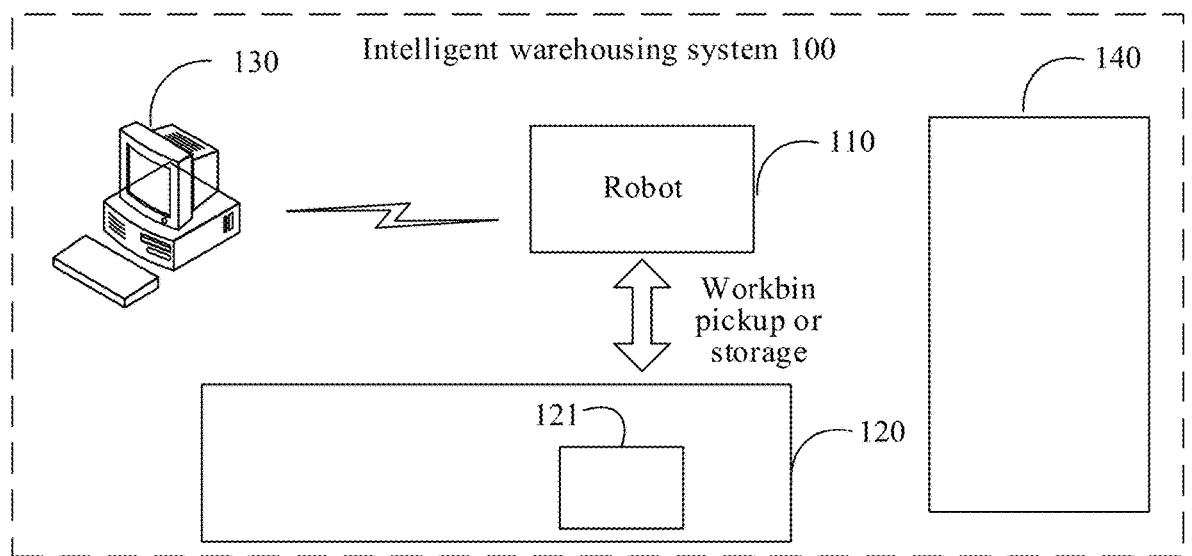
FIG. 1 is a diagram of an application scenario of a material transferring method according to an embodiment of this application.

FIG. 1 is a diagram of an application scenario of a material transferring method according to an embodiment of this application. As shown in FIG. 1, the material transferring method according to the embodiment of this application may run on an electronic device, such as a computer or a server, and may also be performed by a warehouse management device or by another device in a warehousing system. An intelligent warehousing system 100 uses a robot 110 to pick up and/or store materials on a shelf 120, and uses a warehouse management device 130 to perform path planning, state monitoring, and scheduling for the robot 110, so that the robot 110 moves to a set position to pick up or store the materials. The warehouse management device 130 also stores storage information of each storage position of the shelf 120 and basic information of the materials, so as to facilitate warehouse management. When there is an order task in the warehousing system 100, the robot 110 may handle one or more materials 121 located on the shelf 120 and corresponding to the order task to a conveyor line region 140 to complete the order task.

Figure 2A:
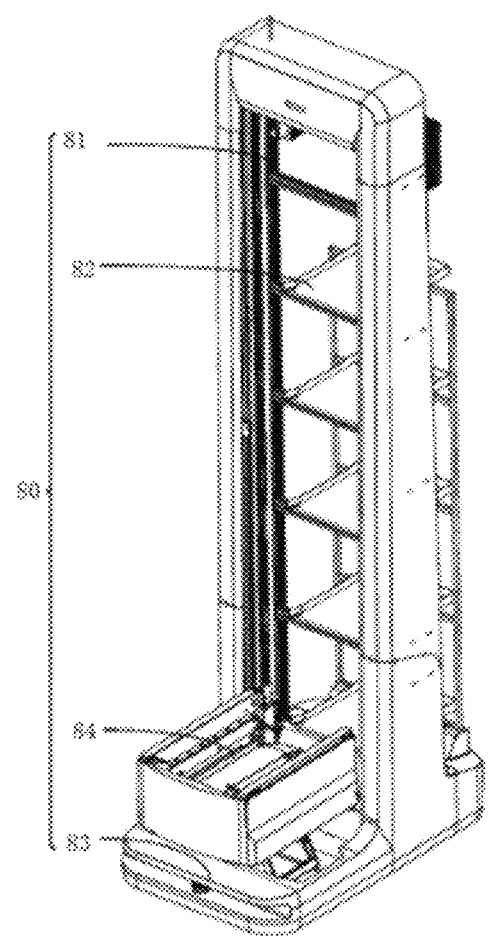
FIG. 2A is a schematic structural diagram of a robot according to an embodiment of this application.

FIG. 2A is a schematic structural diagram of a robot according to an embodiment of this application. As shown in FIG. 2A, a robot 80 includes a mobile chassis 83, a storage shelf 82, a transferring apparatus 84, and a lifting assembly 81. The storage shelf 82, the transferring apparatus 84, and the lifting assembly 81 are all mounted on the mobile chassis 83, and the storage shelf 82 is provided with a plurality of storage units. The lifting assembly 81 is configured to drive the transferring apparatus 84 to move up and down, so that the transferring apparatus 84 is aligned with any storage unit on the storage shelf 82 or aligned with the shelf and/or the materials. The transferring apparatus 84 is rotatable with a vertical direction as an axis to adjust orientation, so as to be aligned with the storage unit or aligned with the shelf and/or the materials. The transferring apparatus 84 is configured to load or unload the materials to handle the materials between the shelf and the storage unit.

For example, the storage shelf 82 may be selectively configured or not configured. When the storage shelf 82 is not configured, the materials are stored in an accommodation space of the transferring apparatus 84 during the transferring of the materials by the robot 80.

The robot 80 in the above embodiment may perform steps involving material transferring in a material transferring method according to any embodiment of this application, so as to realize material transferring between the shelf and a workbench.

During execution of a material storage task by the robot 80, the robot 80 moves to a position of a storage space specified for the materials, and carries a target object from a storage unit of a robot body to the shelf through an adjustment assembly, such as a rotating mechanism, in coordination with the transferring apparatus 84.

Figure 2B:
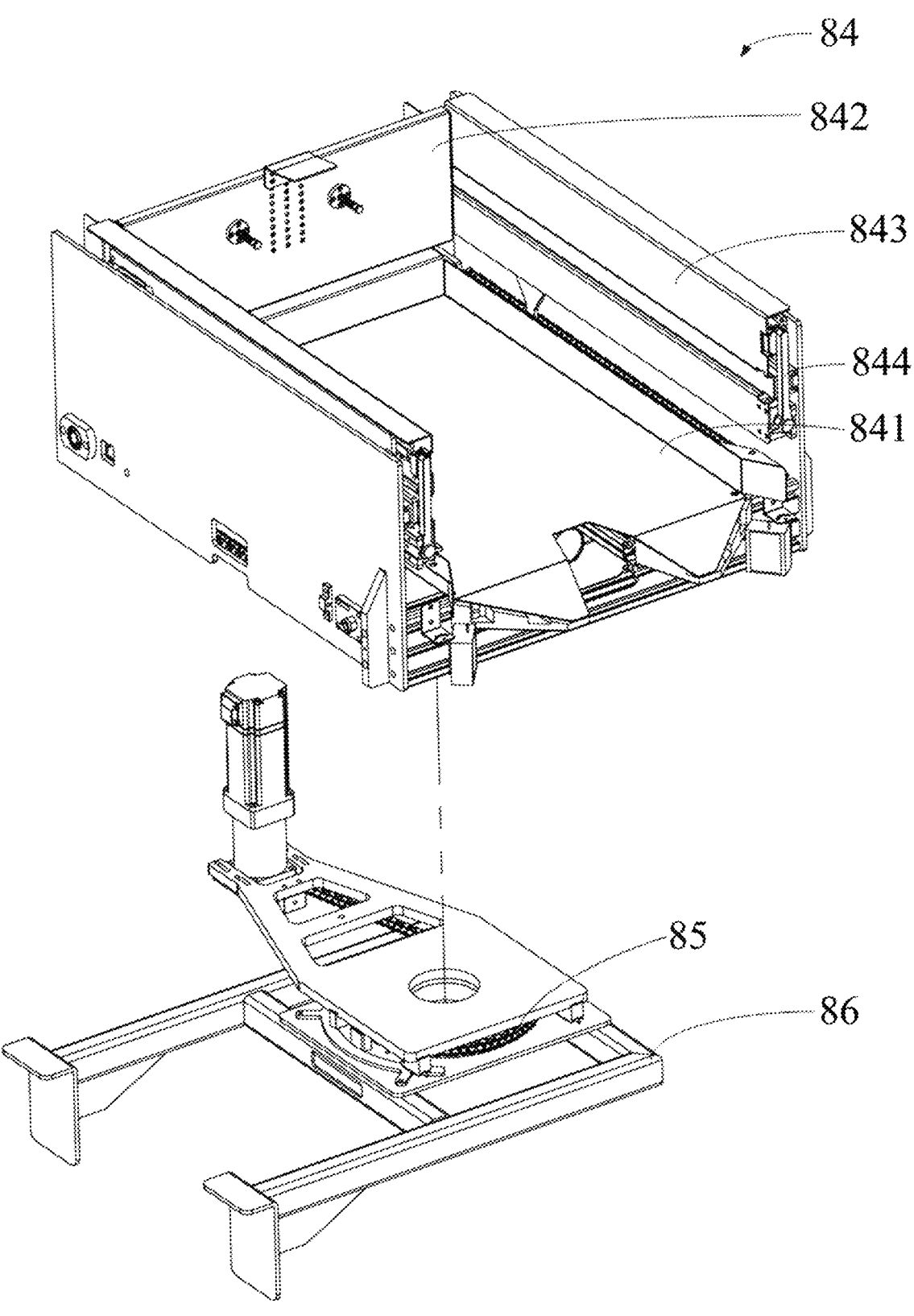
FIG. 2B is a schematic structural diagram of a transferring apparatus in the embodiment shown in FIG. 2A of this application.

For example, FIG. 2B is a schematic structural diagram of a transferring apparatus in the embodiment shown in FIG. 2A of this application.

For example, the transferring apparatus 84 is mounted on a bracket 86 through a rotating mechanism 85, and the rotating mechanism 85 is configured to drive the transferring apparatus 84 to rotate around a vertical axis relative to the bracket 86, so as to be aligned with the storage unit or aligned with the shelf and/or materials. The transferring apparatus 84 is configured to handle the materials between the storage unit and the shelf. If the transferring apparatus 84 is not aligned with the shelf and/or the materials, the transferring apparatus 84 may be driven, through the rotating mechanism 85, to rotate relative to the bracket 86 to ensure that the transferring apparatus 84 is aligned with the shelf and/or the materials.

Figure 2C:
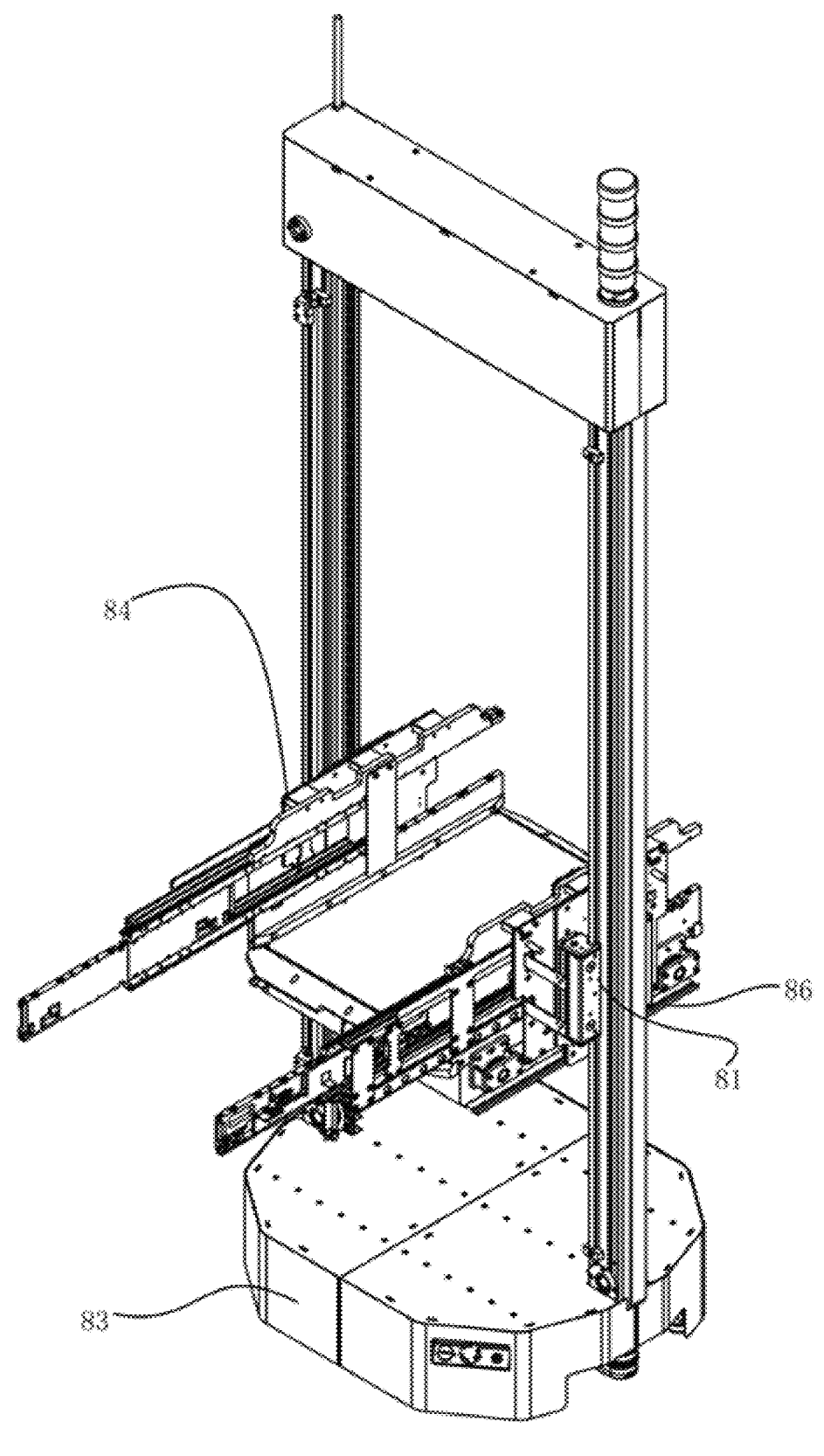
FIG. 2C is a schematic structural diagram of a robot and a transferring apparatus thereof according to an embodiment of this application.

FIG. 2C is a schematic structural diagram of a robot and a transferring apparatus thereof according to an embodiment of this application. It may be understood from FIG. 2A and FIG. 2B that the rotating mechanism 85 may be omitted according to an actual situation. For example, the transferring robot 80 moves on a fixed track. After moving to the vicinity of the shelf, the transferring apparatus 84 is always aligned with the shelf and/or the materials, and the materials are arranged in a materials pickup direction of the transferring apparatus 84.

Figure 2D:
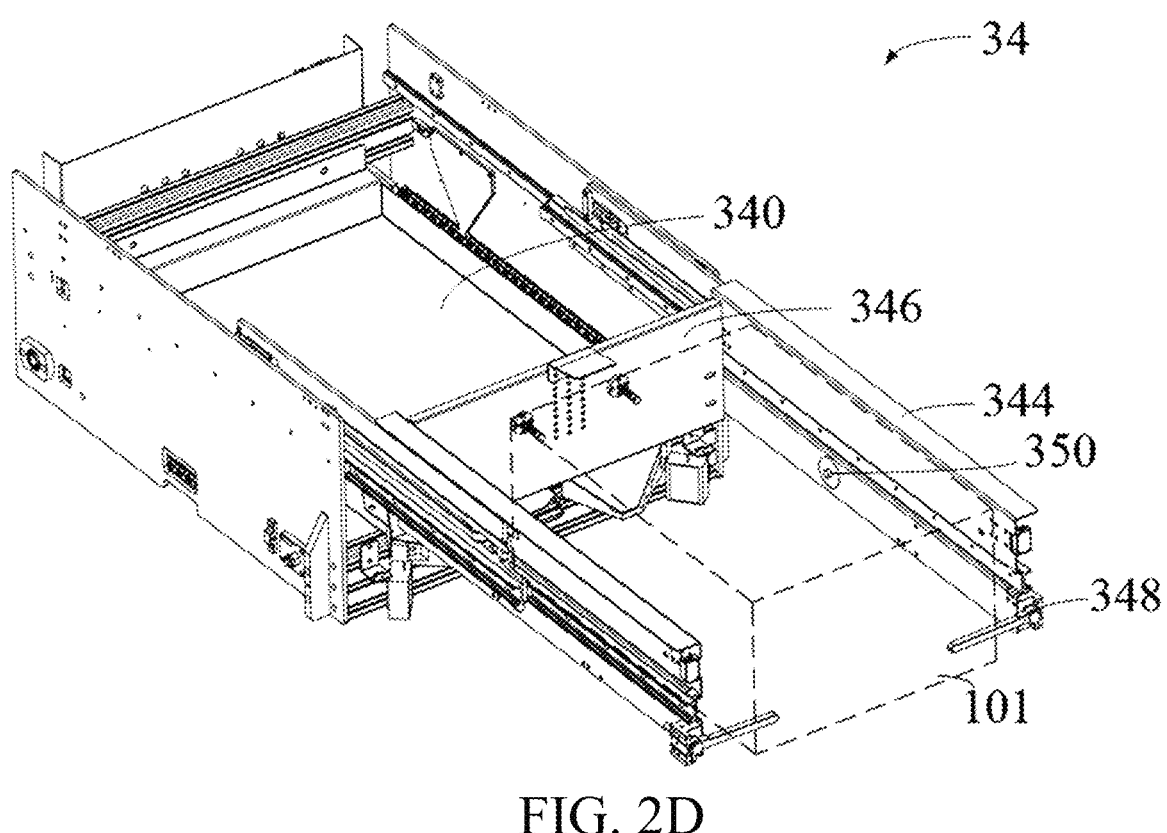
FIG. 2D is a schematic structural diagram of a transferring apparatus in the embodiment shown in FIG. 2A of this application.

For example, FIG. 2D is a schematic structural diagram of the transferring apparatus in the embodiment shown in FIG. 2A of this application. Please refer to FIG. 2B together to facilitate understanding. As shown in FIG. 2D, the transferring apparatus 84 includes a pallet 841 and a telescopic arm assembly. The pallet 841 is configured to place materials, and may be a flat plate disposed horizontally. The telescopic arm assembly is configured to push the materials placed on the pallet 841 out of the pallet 841 or pull the materials to the pallet 841. The telescopic arm assembly includes a telescopic arm 843, a fixed push rod 842, and a movable push rod 844. The telescopic arm 843 includes a left telescopic arm and a right telescopic arm. The telescopic arm 843 may horizontally extend, and in a direction perpendicular to an extension direction of the telescopic arm 843 and parallel to the pallet 841, the telescopic arm 843 is located on one side of the pallet 841. The telescopic arm 843 is powered by a motor, and the power is transferred by a sprocket mechanism. According to an actual situation, the sprocket mechanism may be replaced with a transmission mechanism such as a pulley mechanism or a screw mechanism for actuation. The fixed push rod 842 and the movable push rod 844 are both mounted on the telescopic arm 843, and the fixed push rod 842 and the movable push rod 844 may extend together with the telescopic arm 843. The fixed push rod 842 and the pallet 841 are located on a same side of the telescopic arm 843. The fixed push rod 842 is configured to push the materials out of the pallet 841 when the telescopic arm 843 extends. The movable push rod 844 may be received in the telescopic arm 843. When the movable push rod 844 is not received in the telescopic arm 843, the movable push rod 844, the fixed push rod 842, and the pallet 841 are all located on a same side of the telescopic arm 843, and the movable push rod 844 is located on an extension direction of the fixed push rod 842 along the telescopic arm 843. The movable push rod 844 may be directly driven by the motor. According to an actual situation, the power may also be transferred through a transmission mechanism such as a gear set or a link mechanism. When the movable push rod 844 is not received in the telescopic arm and the telescopic arm 843 retracts, the movable push rod 844 is configured to pull the materials to the pallet 841.

For example, the fixed push rod 842 of the transferring apparatus 84 may be designed as a finger rod structure of the movable push rod 844.

For example, the transferring apparatus 84 may be designed as a structure in which a spacing width of the telescopic arm assembly is adjustable. The spacing width of the telescopic arm assembly may be adjusted according to sizes of the materials during materials storage/fetching.

Figure 2E:
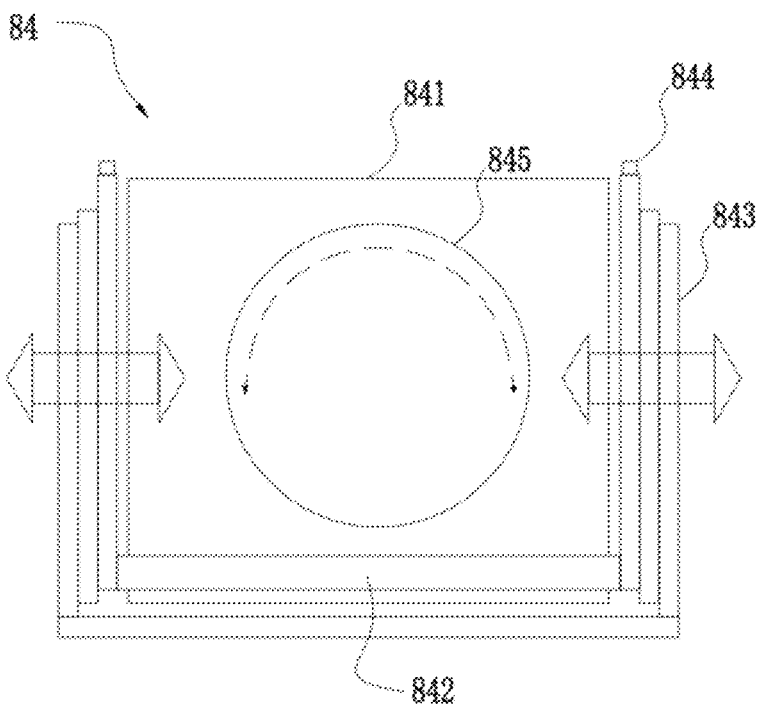
FIG. 2E is a schematic structural diagram of another transferring apparatus in the embodiment shown in FIG. 2A of this application.

For example, the transferring apparatus 84 may further include a steering structure, such as a turntable. The steering structure may be configured to change orientation of the materials placed on the pallet 841 thereof. FIG. 2E is a schematic structural diagram of another transferring apparatus in the embodiment shown in FIG. 2A of this application. It may be seen from FIG. 2E and FIG. 2D that the transferring apparatus 84 may further include a steering structure, that is, a turntable 845 in FIG. 2E, to change orientation of the materials placed on the pallet 841 thereof.

Figure 2F:
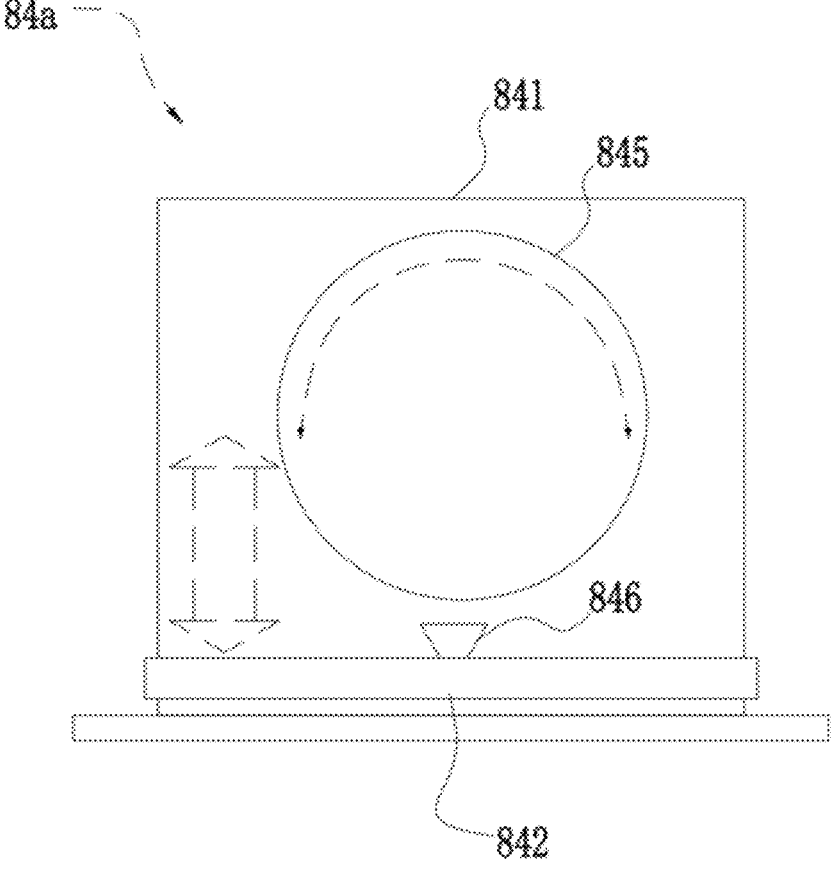
FIG. 2F is a schematic structural diagram of another transferring apparatus in the embodiment shown in FIG. 2A of this application.

For example, FIG. 2F is a schematic structural diagram of another transferring apparatus in the embodiment shown in FIG. 2A of this application. As shown in FIG. 2F, a transferring apparatus 84a includes one or more suction cups 846, which are configured on a fixed push rod 842. The fixed push rod 842 may be rod-shaped or plate-shaped. During materials storage/fetching, the fixed push rod 842 may be driven to make a displacement in a to-and-fro direction towards the materials and/or the shelf. The materials are adsorbed through the suction cup 846, and the materials are handled to the shelf or to the pallet 841 in coordination with displacement of the fixed push rod 842.

Figure 2G:
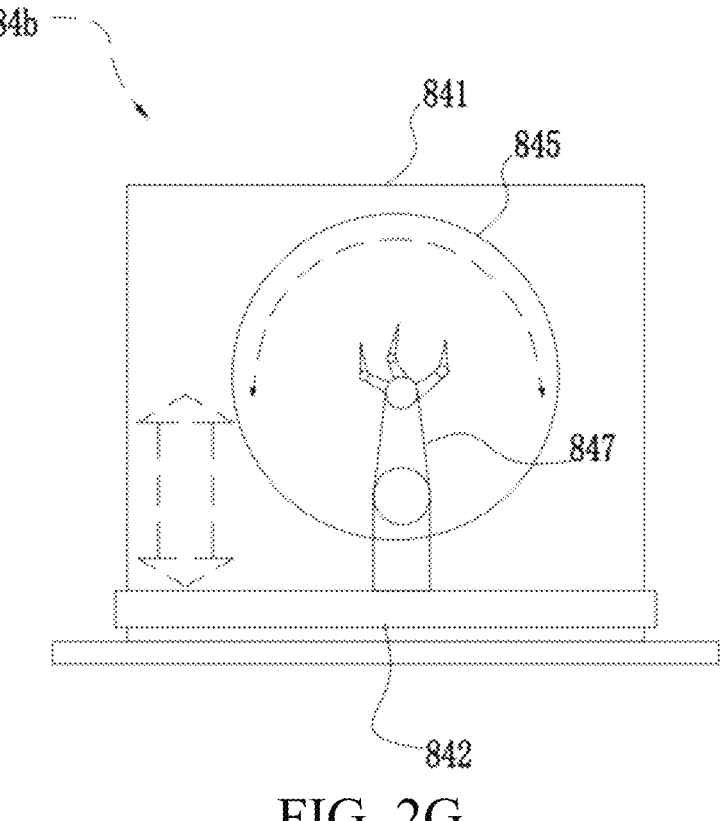
FIG. 2G is a schematic structural diagram of another transferring apparatus in the embodiment shown in FIG. 2A of this application.

For example, FIG. 2G is a schematic structural diagram of another transferring apparatus in the embodiment shown in FIG. 2A of this application. As shown in FIG. 2G, a transferring apparatus 84b includes one or more mechanical arms 847 configured at appropriate positions on the fixed push rod 842 and/or the transferring apparatus 84b. During materials storage/fetching, the fixed push rod 842 may be driven to make a displacement in a to-and-fro direction towards the materials and/or the shelf. The materials are grabbed/hooked through the mechanical arms 847, and the materials are handled to the shelf or to the pallet 841 in coordination with the displacement of the fixed push rod 842.

For example, the transferring apparatus (84a, 84b) may further include a steering structure, such as the turntable 845 in FIG. 2E and FIG. 2F to change orientation of the materials placed on the pallet 841 thereof.

The structure of the transferring apparatus in the embodiments shown in this application may include a combination of one or more in the above examples.

Figure 3:
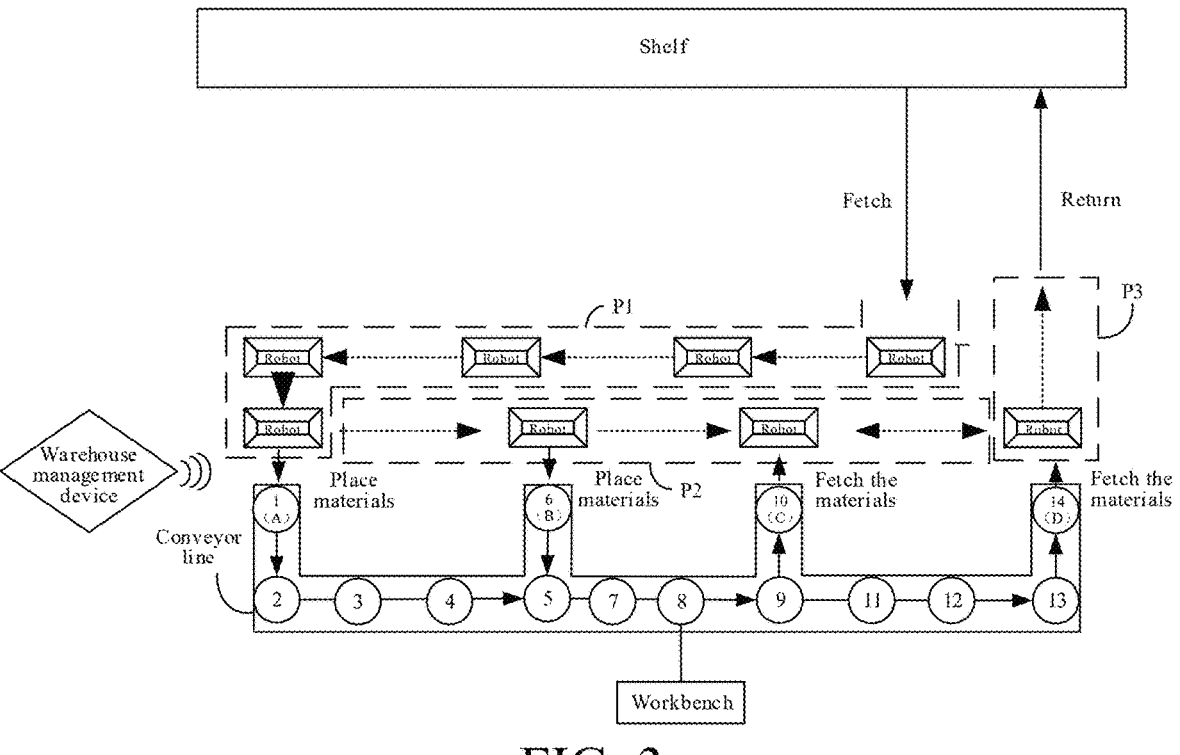
FIG. 3 is a schematic diagram of a specific application scenario of a solution of this application.

FIG. 3 is a schematic diagram of a specific application scenario of a solution of this application. FIG. 3 is applicable to the intelligent warehousing system shown in FIG. 1. As shown in FIG. 3, a warehouse for storing materials is generally provided with a shelf for storing the materials, a conveyor line for conveying materials, and robots for transferring materials. The robots may handle the materials from the shelf to the conveyor line, and the conveyor line may drive the materials to move, so that a workbench on the conveyor line can handle the materials. After the workbench finishes transferring the materials, the robots may handle the materials back to the shelf or other destinations. The warehouse management device may send control instructions to the robots and the conveyor line to control operating states of the robots and the conveyor line.

Referring to FIG. 3, action paths of the robots for transferring the materials through the conveyor line in the warehouse may be roughly divided into three regions, namely a first region P1, a second region P2, and a third region P3. Specifically, after fetching the materials from the shelf, a robot enters the first region P1. When there are a large number of robots, the robots may wait in line in the first region P1. In addition, the robots may move in the second region P2 to go to different positions of the conveyor line. It may be understood that the second region P2 may be set according to positions of entrances and positions of exits of the conveyor line, so as to facilitate the robots to move to different positions of the conveyor line. The first region P1 may partially surround the second region P2, thereby reducing a footprint. At the same time, the influence of the robots waiting in line in the first region P1 on action paths of other robots executing other tasks (such as blocking movement of the other robots) may also be prevented. In addition, the robots may leave from the third region P3 (surrounded by the first region P1, the robots cannot directly leave from the second region P2) to handle the materials back to the shelf or other destinations.

Referring to FIG. 3, according to material transferring directions of the conveyor line, the conveyor line is generally provided with one/a plurality of entrances and one/a plurality of exits, and the robot can go to one entrance via the first region P1 to place the materials (place the materials fetched from a shelf on the conveyor line), or go to another entrance via the second region P2 to place the materials, or go to the exit(s) via the second region P2 to fetch the materials (fetch the materials from the conveyor line and put the materials back on the shelf), and then leave via the third region P3. For example, the conveyor line in FIG. 3 includes two entrances (an entrance A and an entrance B) and two exits (an exit C and an exit D).

A moving direction of the robot is shown by dotted arrows in FIG. 3. After entering the first region P1, the robot may place the materials at the entrance A, or move to the other entrance (such as the entrance B) in the second region P2 to place the materials. The robot may also move to the exit (such as the exit C or the exit D) in the second region P2 to fetch the materials on the conveyor line, and then leave via the third region P3.

It is to be noted that the robot's paths to the position of the entrance and from the position of the entrance to the position of the exit in this application are both one-way movement paths, so as to ensure smoothness and orderliness of the movement of the robot. In addition, a path for the robot to move between different exits may be set to a two-way movement path. For example, the movement between the exit C and the exit D may be set to two-way movement to deal with special situations. For example, when there is only a robot fetching the materials at the exit D on the conveyor line and there is no robot subsequently coming to handle the materials on the entire conveyor line, at the exit D is the last robot. However, there are still materials at the exit C that have not been fetched. Therefore, the robot at the exit D may return to the exit C to fetch the materials after fetching the materials at the exit D.

In addition, the conveyor line is provided with a plurality of material placement positions (circular marks on the conveyor line in FIG. 3). A material may be placed at each material placement position. The robot may place materials at the material placement positions at the entrances (e.g., the entrance A and the entrance B in FIG. 3), and then the conveyor line conveys the materials to the workbench to handle the materials. For example, the conveyor line shown in FIG. 3 is provided with a total of 14 material placement positions. That is, 14 materials may be placed on the conveyor line at the same time.

Optionally, the robots may be classified into first robots and second robots.

The first robots are configured mainly to fetch the materials from the shelf and handle the materials to the conveyor line via the first region P1. That is, an operating logic of the first robots includes: fetching materials from the shelf— transferring the materials to the entrances of the conveyor line via the first region P1—placing the materials at the entrances—leaving the conveyor line via the second region P2 and the third region P3 in sequence.

The second robots are configured mainly to fetch materials handled by the workbench from the conveyor line and move the materials back to the shelf or other destinations. That is, an operating logic of the second robots includes: going to the exits of the conveyor line via the first region P1 and the second region P2—fetching the materials at the exits—leaving the conveyor line via the third region P3—moving the fetched materials back to the shelf or other destinations.

In existing control logic, when going to an entrance position to place materials, a robot generally places all the materials handled on the conveyor line at one time. However, if a quantity of materials placed by all robots exceeds a quantity of materials that can be placed on the conveyor line, the robot cannot perform a material placement action. In this case, the robot needs to wait for other robots to fetch the materials from the conveyor line to obtain a new material placement position before continuing to place the materials. During the waiting, mutual congestion of the robots easily occurs, thereby reducing efficiency of material transferring performed by the robots.

For example, a robot A and a robot B are each loaded with 8 materials. The robot A and the robot B go to the entrance A and the entrance B to place the materials respectively. The materials placed by the robot A may be placed at Position 1 and then conveyed by the conveyor line to Positions 2-5 and 7-14. The materials placed by the robot B may be placed at Position 6 then conveyed by the conveyor line to Positions 5-14. The robot B can go to the exit C or the exit D to fetch the materials only after placing the 8 materials. However, if the robot A has first placed the 8 materials, there may be less than 8 available material placement positions remaining on the conveyor line. That is, the robot B cannot place all the 8 materials loaded therein. Therefore, when the robot B does not place all the materials, the robot B cannot go to the position of the exit. In this case, since there is no robot to fetch the materials, the materials on the conveyor line cannot be fetched, the two entrances have been occupied by the robot A and the robot B, and new robots cannot enter, thereby leading to mutual congestion of the robots and causing "lockup" of the conveyor line.

The material transferring method, the warehouse management device, the warehousing system, the medium, and the product according to this application are intended to solve the above technical problems in the related art.

In the related art, the mutual congestion of the robots is based on a main reason that a limited quantity of materials can be placed on the conveyor line at the same time, and the robot's material storage logic is to place all the materials carried by the robot on the conveyor line. When there are a large number of entrances (greater than or equal to two), mutual congestion of the robots may occur if a quantity of the materials placed by the robot exceeds a quantity of the material placement positions on the conveyor line.

Based on the above, a main idea of this application is as follows. During placement of materials by the robots, the warehouse management device may control a quantity of the materials placed by the robots. That is, the warehouse management device may control the first robot to place all or some of the materials loaded therein, so that the first robot can place different quantities of materials at different first entrances to balance a material carrying capacity on a conveying path corresponding to each entrance. Therefore, a good cycle for the robots to smoothly place the materials and smoothly fetch the materials can be formed, thereby preventing congestion of the robots and lockup of the conveyor line. For example, during the placement of the materials by the robots, the warehouse management device may control the robots to place all or some of the materials loaded therein in combination with specific positions of the first entrances on the conveyor line and current material placement on the conveyor line.

The following describes the technical solutions of this application and how to resolve the foregoing technical problems according to the technical solutions of this application in detail by using specific embodiments. The following several specific embodiments may be combined with each other, and the same or similar concepts or processes may not be described repeatedly in some embodiments. The following describes the embodiments of this application with reference to accompanying drawings.

It may be understood that processing steps of the material transferring method in this application may be implemented by the warehouse management device shown in FIG. 3.

In some embodiments, a material transferring method applied to a warehouse management device is provided. A conveyor line includes M entrances and N exits, where M≥1, N≥1, and M and N are both integers. The M entrances may be provided upstream the workbench at a corresponding position of the conveyor line, and the N exits may be provided downstream the workbench at the corresponding position of the conveyor line. Therefore, the conveyor line can convey the materials placed by the robots at positions of the entrances to the workbench for transferring, and convey the materials handled by the workbench to positions of the exits, to facilitate the robots to fetch the materials.

Figure 4:
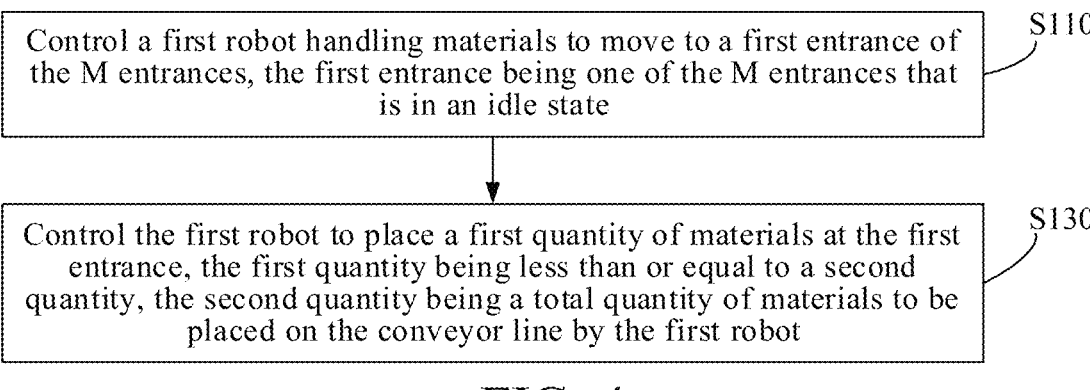
FIG. 4 is a schematic diagram of a material transferring method according to an embodiment of this application.

FIG. 4 is a schematic diagram of a material transferring method according to an embodiment of this application. As shown in FIG. 4, the method mainly includes the following operations:

In block S110, a first robot transferring materials is controlled to move to a first entrance of the M entrances, the first entrance being one of the M entrances that is in an idle state.

In block S130, the first robot is controlled to place a first quantity of materials at the first entrance, the first quantity being less than or equal to a second quantity, the second quantity being a total quantity of materials to be placed on the conveyor line by the first robot.

The first robot refers to a robot configured to handle the materials from the shelf to the conveyor line. During the transferring of the materials, the materials may specifically be packaged or stored in a specific form, which may be stored, for example, in boxes or other structures, so that the robots can perform a material transferring operation.

The conveyor line includes M entrances and N exits, which may specifically include 1 entrance and 1 exit, that is, the conveyor line is a single-input single-output structure; or include 1 entrance and a plurality of exits, that is, the conveyor line is a single-input multiple-output structure; or include a plurality of entrances and 1 exit, that is, the conveyor line is a multiple-input single-output structure; or include a plurality of entrances and a plurality of exits, that is, the conveyor line is a multiple-input multiple-output structure.

For ease of understanding, in embodiments of this application, the technical solutions of this application are explained specifically by taking a double-input double-output structure shown in FIG. 3 as an example. It may be understood that specific solutions of the embodiments may also be extended to a single-input single-output structure, other single-input multiple-output structures (such as single-input three-output), other multiple-input single-output structures (such as three-input single-output), and other multiple-input multiple-output structures (such as three-input four-output).

When materials need to be handled, the warehouse management device first determines the first entrance, that is, determines an entrance currently in an idle state from the M entrances, and then controls the first robot transferring the materials to move to the position of the first entrance. After the first robot arrives at the first entrance, the warehouse management device controls the first robot to perform an action of placing the materials.

This embodiment is different from the related art in that, during placement of the materials, a quantity of the materials placed by the first robot is a first quantity. The first quantity is less than or equal to a second quantity. That is, the quantity of the materials placed by the robot is less than or equal to a total quantity of materials to be placed by the first robot on the conveyor line (i.e., a total quantity of materials loaded in the first robot). In other words, in this embodiment, the first robot is controlled to place all or part of the materials.

For example, if the total quantity of the materials to be placed by the first robot on the conveyor line is 8, the warehouse management device may control the first robot to place only some of the materials at the first entrance, for example, 2 materials (the remaining materials are to be subsequently placed at the first entrance or at other entrances at other times); or control the first robot to sequentially place all the 8 materials at the first entrance.

Optionally, the warehouse management device may determine a specific quantity of materials placed by the first robot in combination with a specific position of the first entrance on the conveyor line and current material placement on the conveyor line. For example, if a large quantity of materials are currently placed on the conveyor line and a material carrying capacity is large, the warehouse management device may control the first robot to place some of the materials. If a small quantity of materials are currently placed on the conveyor line and the material carrying capacity is small, the warehouse management device may control the first robot to place all the materials.

In this embodiment, during placement of materials by robots, the warehouse management device may control a quantity of the materials placed by the robots. That is, the warehouse management device may control the first robot to place all or some of the materials loaded therein, so that the first robot can place different quantities of materials at different first entrances to balance a material carrying capacity on a conveying path corresponding to each entrance. Therefore, a good cycle for the robots to smoothly place the materials and smoothly fetch the materials can be formed, thereby preventing congestion of the robots and lockup of the conveyor line.

In some embodiments, when the conveyor line includes one entrance, the first quantity is equal to the second quantity.

Specifically, when the conveyor line includes only one entrance (i.e., M=1), the first robots loaded with materials all go to the entrance to place the materials. Therefore, the warehouse management device controls the first robots to place all the materials on the conveyor line. Then, after the current first robot has placed all the materials and left the entrance, the following first robot may also go to the entrance to place the materials. Therefore, all the first robots can smoothly place materials, preventing congestion of the robots at the entrance.

Figure 5:
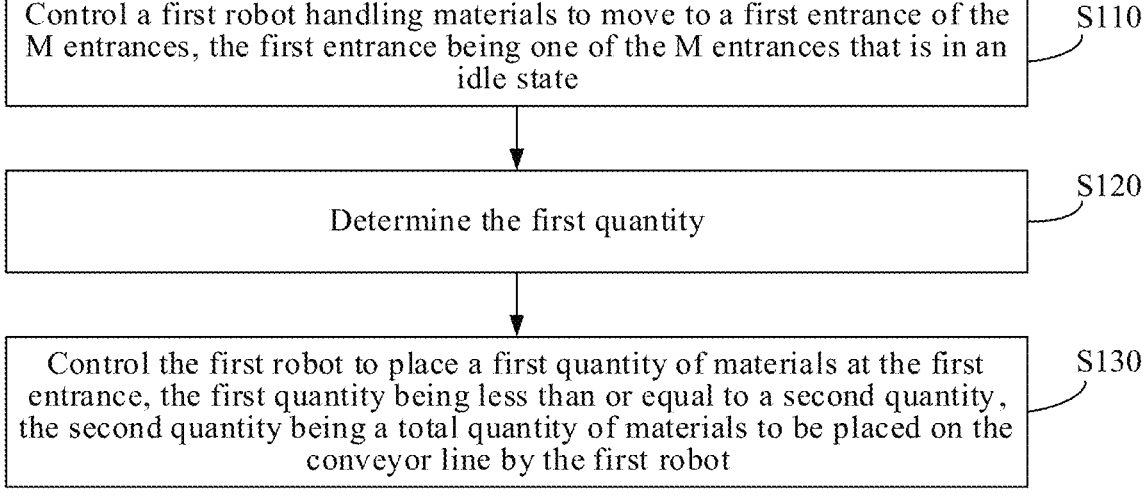
FIG. 5 is another schematic diagram of the material transferring method according to an embodiment of this application.

FIG. 5 is another schematic diagram of the material transferring method according to an embodiment of this application. As shown in FIG. 5, when the conveyor line includes at least two entrances, the method further includes the following step:

In S120, the first quantity is determined.

Specifically, the first robot's action of placing the materials is controlled by the warehouse management device. Therefore, before the first robot performs the action of placing the materials, the warehouse management device needs to first determine the first quantity, and then controls the first robot to perform the action of placing the materials, that is, controls the first robot to place some or all of the materials.

In this embodiment, the warehouse management device may determine a specific value of the first quantity in combination with the specific position of the first entrance on the conveyor line and current material placement on the conveyor line, so that normal operation of other robots may not be affected after the first robot places the first quantity of materials, thereby preventing congestion of the robots and lockup of the conveyor line.

In some embodiments, the determining the first quantity includes: determining that the first quantity is equal to the second quantity when the first entrance is an entrance closest to a workbench; and determining the first quantity according to a third quantity, a fourth quantity, and a fifth quantity when the first entrance is one of the M entrances except the entrance closest to the workbench.

The third quantity is a quantity of materials to be placed by robots at a second entrance of the M entrances except the first entrance, and a distance between the second entrance and the workbench is less than that between the first entrance and the workbench. The fourth quantity is a quantity of materials available for current placement on the conveyor line. The fifth quantity is a total quantity of materials available for current fetching by robots at the N exits.

Specifically, when the first entrance is an entrance closest to the workbench, for example, the entrance B shown in FIG. 3, the first robot needs to place all the materials on the conveyor line to go to the position of the exit in this case. Therefore, the warehouse management device determines that the first quantity is equal to the second quantity. That is, the warehouse management device controls the first robot to place all the materials on the conveyor line.

When the first entrance is one of the M entrances except the entrance closest to the workbench, for example, the entrance A shown in FIG. 3, among the M entrances, a second entrance other than the first entrance is the entrance B and the second entrance (the entrance B) is the entrance closest to the workbench in this case. If there are other robots parked at the second entrance, that is, in this case, the first robots placing the materials also exist at the entrance B shown in FIG. 3, since the first robot at the entrance B places all the materials on the conveyor line, the warehouse management device needs to determine, according to the third quantity, the fourth quantity, and the fifth quantity, a quantity of materials that can be placed by the first robot at the entrance A, so as to prevent impossible placement of all the materials on the conveyor line by the first robot at the entrance A due to an excessive quantity of materials placed by the first robot at the entrance A, thereby preventing congestion of the robots.

In some embodiments, the determining the first quantity according to a third quantity, a fourth quantity, and a fifth quantity includes: obtaining the first quantity through the following formula:

$$N1=N4+N5-N3$$

where N1 denotes the first quantity, N3 denotes the third quantity, N4 denotes the fourth quantity, and N5 denotes the fifth quantity.

Referring to FIG. 3, the first quantity N1 may specifically indicate a quantity of materials placed by the first robot at the entrance A, the third quantity N3 may specifically indicate a quantity of materials placed by the first robot at the entrance B, the fourth quantity N4 may specifically indicate a quantity of available material placement positions on the conveyor line that are currently idle, and the fifth quantity N5 may specifically indicate a total quantity of materials available for current fetching by the robots at the exit C and the exit D.

When there are no robots for fetching the materials parked at the exit C and the exit D, the value of the fifth quantity N5 is 0. When there are robots for fetching the materials parked at the exit C and/or the exit D, the value of the fifth quantity N5 may be determined according to material loading capacities of the robots parked at the exit C and/or the exit D (such as a quantity of empty storage units of the robots).

For example, referring to FIG. 3, assuming that the robot A places materials at the entrance A and the robot A is loaded with 8 materials; the robot B places materials at the entrance B and the robot B is loaded with 9 materials; there is no robot parked at the exit C; a robot D fetches materials at the exit D and a total quantity of materials that can be currently loaded in the robot D is 2; a quantity of materials that can be currently placed on the conveyor line is 14, that is, the third quantity N3=9, the fourth quantity N4=14, and the fifth quantity N5=2. Then, the first quantity N1=N4+N5−N3=14+2−9=7, which indicates that the robot A at the entrance A currently can place only 7 materials. The robot A cannot place all the materials (8 materials) on the conveyor line, which may cause congestion of the robots otherwise.

In some embodiments, the controlling a first robot transferring materials to move to a first entrance of the M entrances includes: determining, when the M entrances include at least two idle entrances, that one of the at least two idle entrances that is closest to the workbench is the first entrance; and controlling the first robot to move to the first entrance.

Specifically, when there are currently at least two idle entrances, the warehouse management device may control the first robot to go to the idle entrance closest to the workbench. On the one hand, it can ensure that other first robots subsequently moving to positions of the conveyor line can smoothly go to other entrances to place materials. On the other hand, after placing the materials, the first robot can directly go to the position of the exit without blocking the other first robots.

For example, referring to FIG. 3, if the entrance A and the entrance B are both idle entrances at present, since the entrance B is closest to the workbench, the warehouse management device controls the current first robot to go to the entrance B to place materials, and other subsequent first robots may go to the entrance A to place materials without being blocked by the current first robot. Moreover, after placing the materials, the current first robot may directly go to the exit C or the exit D.

In some embodiments, the method further includes: before the first robot finishes placing all the materials to be placed on the conveyor line, controlling, if there is a third entrance, the first robot to move to the third entrance and place the remaining materials to be placed at a position of the third entrance. The third entrance is one of the M entrances that is in an idle state, and a distance between the third entrance and the workbench is less than that between the first entrance and the workbench.

Specifically, in order to ensure that the first robot currently placing the materials may not block the subsequent robots, the warehouse management device may update, in real time according to states of the entrances of the conveyor line, the entrance at which the first robot placing the materials places the materials.

For example, referring to FIG. 3, a first robot R1 is placing materials at the entrance A, a first robot R2 is placing materials at the entrance B, and after the first robot R2 places all the materials, the first robot R2 goes to the exit C or the exit D, and the entrance B becomes an idle entrance. In this case, if a first robot R3 needs to place materials and the first robot R1 is still placing materials at the entrance A, due to the blocking of the first robot R1, the first robot R3 cannot directly go to the entrance B, resulting in congestion of robots. It should be noted that, in the description of the present disclosure, "R1", "R2" and "R3" are only used to distinguish between different robots, that is, "R1", "R2" and "R3" are only used to indicate that they are different robots, not to indicate a reference sign.

Regarding the above situation, in this embodiment, the warehouse management device may determine that the entrance B is a third entrance meeting a condition when determining that the entrance B becomes an idle entrance and a distance between the entrance B and the workbench is less than that between the entrance A and the workbench. Therefore, the warehouse management device may control the first robot R1 to move to the entrance B and place remaining to-be-placed materials at the entrance B. Therefore, when the first robot R3 needs to place materials, the first robot R3 can smoothly go to the entrance A without being blocked by the first robot R1.

In this embodiment, the warehouse management device may update, in real time according to states of the entrances of the conveyor line, the entrance at which the first robot placing the materials places the materials, so as to ensure that the first robot currently placing the materials may not block the subsequent robots, preventing congestion of the robots.

In some embodiments, the method further includes: controlling the first robot to move to a first exit of the N exits when the first robot finishes placing all the materials to be placed on the conveyor line, the first exit being one of the N exits that is in an idle state; and controlling the first robot to fetch, at a position of the first exit, the materials handled by the workbench from the conveyor line.

Specifically, after the first robot completes placement of all the materials, the first robot has not left the conveyor line in this case. In this case, if there is no second robot to fetch materials at the position of the exit, generally, in the related art, the warehouse management device needs to first control the first robot to leave the conveyor line, and then control the second robot to go to the position of the exit to fetch the materials.

However, in an actual scenario, the following situation may occur. Referring to FIG. 3, the first robot R1 is placing materials at the entrance A, the first robot R2 is placing materials at the entrance B, and after the first robot R1 has placed the materials, there is no idle material placement position available on the conveyor line, and the first robot R2 has not finished placing the materials. In this case, due to the blocking of the first robot R2, the second robot cannot directly go to the exit C or the exit D to fetch materials, thereby causing congestion of robots.

Regarding the above situation, in this embodiment, after the first robot R1 has placed the materials, the warehouse management device controls the first robot R1 to go to the exit C or the exit D to perform a material fetching operation, so that a new idle material placement position is generated on the conveyor line, and the first robot R2 can continue to place materials. After the first robot R2 has placed the materials, the warehouse management device may also control the first robot R2 to go to the exit C or the exit D to perform the material fetching operation, so that a new idle material placement position is continuously generated on the conveyor line, and the subsequent first robots can continue to place materials. Therefore, the warehouse management device can prevent congestion of robots by controlling the first robot to perform the material fetching operation.

In some embodiments, the controlling the first robot to move to a first exit of the N exits includes: determining, when the N exits include at least two idle exits, that one of the at least two idle exits that is farthest from the workbench is the first exit; and controlling the first robot to move to the first exit.

Specifically, when there are currently at least two idle exits, the warehouse management device may control the current first robot to go to the idle entrance farthest from the workbench. On the one hand, it can ensure that other first robots subsequently moving to the position of the exit can smoothly go to other exits to perform the material fetching operation without being blocked by the current first robot. On the other hand, after fetching the materials, the first robot can directly leave from the position of the exit without blocking the other first robots.

For example, referring to FIG. 3, if the exit C and the exit D are both idle exits at present, since the exit D is farthest from the workbench, after the first robot R1 has placed the materials, the warehouse management device controls the current first robot R1 to go to the exit D to perform the material fetching operation, the first robot R2, after placing the materials, may subsequently smoothly go to the exit C to perform the material fetching operation without being blocked by the first robot R1. Moreover, the first robot R1, after fetching the materials, may directly leave through the exit D.

In some embodiments, the controlling the first robot to move to a first exit of the N exits includes: controlling, when second robots exist at all the N exits, the second robots to leave the corresponding exits to obtain the first exit; and controlling the first robot to move to the first exit.

Specifically, after the first robot has placed the materials at the position of the entrance, if the second robots performing the material fetching operation exist at all the exits, the warehouse management device may force the second robot to leave to obtain the first exit and control the first robot that has placed the materials to go to the first exit to perform the material fetching operation, so as to prevent congestion of robots.

In some embodiments, when a quantity of the exits is one (i.e., N=1), the warehouse management device directly controls the second robot at the exit to leave, so that the unique exit becomes the first exit, facilitating the first robot to go to the first exit to fetch materials.

In some embodiments, the controlling the second robots to leave the corresponding exits to obtain the first exit includes: controlling the second robot at the exit farthest from the workbench to leave to obtain the first exit.

Specifically, when there are a plurality of exits, since the second robot at the exit farthest from the workbench may directly leave a conveyor line region, the warehouse management device may control the second robot at the exit farthest from the workbench to directly leave. In this case, the exit farthest from the workbench becomes idle. In this case, when other robots exist at all the N exits except the exit farthest from the workbench, due to the blocking of the other robots, the first robot that has placed the materials cannot directly go to the exit farthest from the workbench. Therefore, the warehouse management device further controls the other robots to move. Specifically, the other robots at positions of the exits are sequentially moved one exit position further away from the workbench, so that the exit closest to the workbench becomes an idle exit.

For example, referring to FIG. 3, assuming that the first robot R1 is placing materials at the entrance B, the second robot R2 is fetching materials at the exit C, and a second robot R3 is fetching materials at the exit D, after the first robot R1 has placed the materials, the first robot R1 needs to go to the position of the exit to fetch materials. However, in this case, the second robots exist at both the exit C and the exit D, thereby causing congestion of robots.

Regarding the above situation, in this embodiment, the warehouse management device may force the second robot R3 at the exit D to leave, so that the exit D becomes idle. Then, the warehouse management device controls the second robot R2 to move to the exit D, so that the exit C becomes idle. Therefore, the first robot R1 could go to the exit C to fetch materials, so as to solve the problem of congestion of robots.

In some embodiments, the method further includes: when a quantity of materials fetched by the first robot at the position of the first exit does not reach a maximum quantity of materials stored by the first robot, if there is a second exit, controlling the first robot to move to the second exit and fetch, at a position of the second exit, materials handled by the workbench. The second exit is one of the N exits that is in an idle state, and a distance between the second exit and the workbench is greater than that between the first exit and the workbench.

Specifically, in order to ensure that the first robot currently fetching the materials may not block the subsequent robots, the warehouse management device may update, in real time according to states of the exits of the conveyor line, the position of the exit at which the first robot fetching the materials fetches the materials.

For example, referring to FIG. 3, the first robot R1 is fetching materials at the exit C, the first robot R2 is fetching materials at the exit D, and after the first robot R2 meets a material fetching completion condition (e.g., full of materials), the first robot R2 leaves from the exit D, and the exit D becomes an idle exit. In this case, if the first robot R3 needs to fetch materials and the first robot R1 is still fetching materials at the exit C, due to the blocking of the first robot R1, the first robot R3 cannot directly go to the exit D, resulting in congestion of robots.

Regarding the above situation, in this embodiment, the warehouse management device may determine that the exit D is a second exit meeting a condition when determining that the exit D becomes an idle exit and a distance between the exit D and the workbench is greater than that between the exit C and the workbench. Therefore, the warehouse management device may control the first robot R1 to move to the exit D and continue to fetch materials at the exit D. Therefore, when the first robot R3 needs to fetch materials, the first robot R3 can smoothly go to the exit C without being blocked by the first robot R1.

In this embodiment, the warehouse management device may update, in real time according to states of the exits of the conveyor line, the exit at which the first robot fetching the materials fetches the materials, so as to ensure that the first robot currently fetching the materials may not block the subsequent robots, preventing congestion of the robots.

In some embodiments, when the conveyor line includes at least two entrances, the method further includes: controlling the conveyor line to preferentially convey the materials placed by the first robot at the entrance closest to the workbench.

Specifically, when controlling the robot to convey the materials, the warehouse management device may also control an operating state of the conveyor line, that is, control a state in which the conveyor line conveys the materials.

For example, referring to FIG. 3, a conveying path of materials is indicated by labels of material placement positions. A conveying path of materials placed by the robot at the entrance A on the conveyor line is 1-2-3-4-5-7-8-9-10 or 1-2-3-4-5-7-8-9-11-12-13-14. A conveying path of materials placed by the robot at the entrance B on the conveyor line is 6-5-7-8-9-10 or 6-5-7-8-9-11-12-13-14.

In order to ensure that the robot at the entrance B could place all the materials as soon as possible to go to the position of the exit (leave or fetch materials), the warehouse management device may control the conveyor line to preferentially convey the materials at the entrance B (i.e., Position 6) to the workbench for material transferring according to a conveying path of 6-5-7-8, and then convey materials placed by the first robot at the other entrance (the entrance A) on the premise of ensuring that the first robot at the entrance closest to the workbench (the entrance B) can place all the materials. Therefore, after placing the materials, the first robot at the entrance B can go to the exit C or the exit D to fetch materials, preventing congestion of robots.

In some embodiments, the controlling the conveyor line to preferentially convey the materials placed by the first robot at the entrance closest to the workbench includes: controlling the conveyor line to convey materials on a first conveying path to the workbench; and during the controlling the conveyor line to convey materials on a first conveying path to the workbench, controlling the conveyor line to suspend conveying materials on a second conveying path until there are no materials on the first conveying path or a quantity of the materials on the first conveying path is less than a maximum conveying quantity of the materials on the first conveying path.

The first conveying path is a path for the conveyor line to convey the materials placed by the first robot at the entrance closest to the workbench to the workbench. The second conveying path is a path for the conveyor line to convey the materials placed by the first robot at one of the M entrances except the entrance closest to the workbench to the workbench. The first conveying path and the second conveying path are specifically paths to convey materials to the workbench.

Specifically, in a process of controlling the conveyor line to preferentially convey the materials on the first conveying path to the workbench, the warehouse management device may control the conveyor line to suspend conveying the materials on the second conveying path, that is, control the conveyor line to convey only the materials placed by the first robot at the entrance closest to the workbench, so as to achieve preferential conveying.

When there are no materials on the first conveying path or a quantity of materials on the first conveying path is less than a maximum conveying quantity of materials on the first conveying path, it indicates that all the materials placed by the first robot at the entrance closest to the workbench have been conveyed or placed. In this case, at the entrance closest to the workbench, no new materials enter the conveyor line for the time being. Therefore, the warehouse management device may control the conveyor line to start conveying the materials placed by the first robot at other entrances except the entrance closest to the workbench.

For example, referring to FIG. 3, the first conveying path in the figure is specifically 6-5-7-8, and the second conveying path is specifically 1-2-3-4-5-7-8. In a case where the first robot places materials at both the A entrance and the B entrance, when the warehouse management device controls the conveyor line to suspend conveying the materials on the second conveying path, that is, the materials at material storage positions 1-4 remain unchanged, the first robot may place at most 4 materials at the entrance A. In this case, the warehouse management device controls the conveyor line to preferentially convey the materials placed by the first robot at the entrance B to the workbench according to a conveying path of 6-5-7-8, and after determining that there are no materials on the first conveying path or a quantity of materials on the first conveying path is less than a maximum conveying quantity of materials on the first conveying path, start to convey the materials placed by the first robot at the entrance A according to a conveying path of 1-2-3-4-5-7-8, so as to ensure that the robot placing materials at the entrance B can go to the position of the exit as soon as possible, thereby preventing congestion of robots.

In some embodiments, the controlling the conveyor line to preferentially convey the materials placed by the first robot at the entrance closest to the workbench includes: controlling the conveyor line to convey materials on a third conveying path to the workbench; and controlling the conveyor line to convey a sixth quantity of materials on a fourth conveying path to the workbench, the sixth quantity being less than a total quantity of materials on the fourth conveying path, the sixth quantity being determined according to a seventh quantity, an eighth quantity, and a ninth quantity.

The third conveying path is a path for the conveyor line to convey the materials placed by the first robots at the entrance closest to the workbench. The fourth conveying path is a path for the conveyor line to convey the materials placed by the first robot at one of the M entrances except the entrance closest to the workbench. The third conveying path and the fourth conveying path are specifically paths to convey materials to the exits.

In addition, the seventh quantity is a total quantity of materials on the third conveying path; the eighth quantity is a quantity of materials available for current placement on the conveyor line; and the ninth quantity is a total quantity of materials available for current fetching by robots at the N exits.

Specifically, when controlling the operating state of the conveyor line, the warehouse management device may set a material release mechanism to control a quantity of materials conveyed to the workbench through the fourth conveying path on the premise of ensuring that the first robot at the entrance closest to the workbench can place all the materials on the conveyor line.

For example, referring to FIG. 3, the third conveying path includes 6-5-7-8-9-10 and 6-5-7-8-9-11-12-13-14, and the fourth conveying path includes 1-2-3-4-5-7-8-9-10 and 1-2-3-4-5-7-8-9-11-12-13-14. The material storage position 4 may be set to a release position. The sixth quantity N6 may specifically indicate a quantity of materials on the fourth conveying path corresponding to the first robot at the entrance A released to the downstream of the material storage position 4, the seventh quantity N7 may specifically indicate a quantity of materials on the third conveying path corresponding to the first robot at the entrance B, the eighth quantity N8 may specifically indicate a quantity of available material placement positions currently idle on the third conveying path, and the ninth quantity N9 may specifically indicate a total quantity of materials that can be currently fetched by the robots at the exit C and the exit D.

When there are no robots for fetching the materials parked at the exit C and the exit D, the value of the ninth quantity N9 is 0. When there are robots for fetching the materials parked at the exit C and/or the exit D, the value of the ninth quantity N9 may be determined according to material loading capacities of the robots parked at the exit C and/or the exit D (such as a quantity of empty storage units of the robots).

In this embodiment, the sixth quantity N6 may specifically be calculated through the following formula:

$$N6=N8+N9-N7$$

For example, assuming that the first robot R1 is placing materials at the entrance A, the first robot R1 is loaded with 10 materials, and since the material storage position 4 is a release position, the first robot R1 can place only 4 materials at present when materials are not released; the first robot R2 is placing materials at the entrance B, and the first robot R2 is loaded with 6 materials; there is no robot parked at the exit C; the robot R3 is fetching materials at the exit D, and a total quantity of materials that can be currently fetched by the robot R3 is 5; a quantity of materials that can be currently placed on the conveyor line is 3, that is, the seventh quantity N7=6, the eighth quantity N8=3, and the ninth quantity N9=5. Then, the sixth quantity N6=N8+N9-N7=3+5-6=2, which indicates that the first robot R1 at the entrance A can place 4 materials, but only 2 materials can be released at the release position (after the materials are released, the first robot R1 can place 2 more materials, that is, the first robot R1 can place 6 materials in total) to ensure that the first robot R2 can place, at the entrance B, all the materials on the conveyor line, so as to ensure that the first robot R2 placing materials at the entrance B can go to the position of the exit as soon as possible, preventing congestion of robots.

In some embodiments, when the conveyor line includes at least two exits, the method further includes: controlling the conveyor line to preferentially convey the materials handled by the workbench to the exit farthest from the workbench.

For example, referring to FIG. 3, after the workbench finishes material transferring at Position 8, if material storage positions 9-14 are all in an idle state, the warehouse management device controls the conveyor line to preferentially convey the handled materials to the exit D (i.e., Position 14). The robot that has placed the materials also preferentially goes to the exit D to fetch materials, thereby ensuring that the robot going to the exit D can fetch the materials in time.

Optionally, the warehouse management device, if determining that the handled materials are currently stored at the material storage positions 11-14, controls the conveyor line to convey the materials to the exit C (i.e., Position 10) to ensure that there are materials to be fetched at each exit, so that the robot at a position of each exit can perform the material fetching operation, and a new idle material storage position is generated on the conveyor line, facilitating the conveyor line to normally convey the materials.

It should be understood that, although the steps in the flowcharts in the foregoing embodiments are displayed in sequence as indicated by the arrows, the steps are not necessarily performed in the order indicated by the arrows. Unless otherwise clearly specified herein, the steps are performed without any strict sequence limitation, and may be performed in other orders. In addition, at least some steps in the figures may include a plurality of sub-steps or a plurality of stages, and such sub-steps or stages are not necessarily performed at a same moment, and may be performed at different moments. The sub-steps or stages are not necessarily performed sequentially, but may be performed in turn or alternately with other steps or at least some of sub-steps or stages of the other steps.

Figure 6:
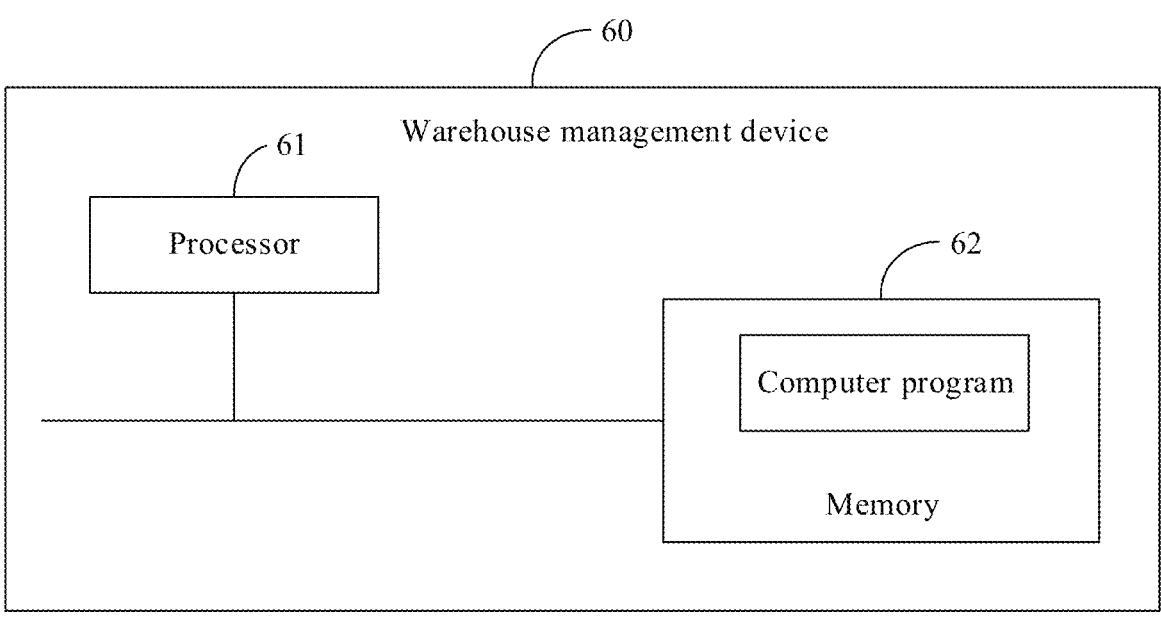
FIG. 6 is a schematic diagram of a warehouse management device according to an embodiment of this application.

In some embodiments, a warehouse management device is provided. FIG. 6 is a schematic diagram of a warehouse management device according to an embodiment of this application. As shown in FIG. 6, the warehouse management device 60 includes: at least one processor 61; and a memory 62 in communication connection with the at least one processor. The memory 62 stores instructions executable by the at least one processor 61. The instructions are executed by the at least one processor 61 to cause the warehouse management device 60 to perform the material transferring method according to the foregoing embodiments.

The memory and the processor are directly or indirectly electrically connected to each other to implement data transmission or exchange. For example, these elements may be electrically connected to each other by using one or more communication buses or signal lines, for example, may be connected by using a bus. The memory stores computer-executable instructions for implementing a data access control method, including at least one software function module that can be stored in the memory in a form of software or firmware. The processor executes various function applications and data processing by running the software program and module stored in the memory.

The memory may be, but is not limited to, a random access memory (RAM), a read-only memory (ROM), a programmable read-only memory (PROM), an erasable programmable read-only memory (EPROM), an electrically erasable read-only memory (EEPROM), or the like. The memory is configured to store the program, and the processor executes the program after receiving an execution instruction. Further, the software program and module in the memory may further include an operating system which may include various software components and/or drivers configured for system task management (such as memory management, storage device control, and power management), and may communicate with various hardware or software components to provide a running environment of other software components.

The processor may be an integrated circuit chip and has a signal processing capability. The foregoing processor may be a general-purpose processor, including a central processing unit (CPU), a network processor (NP), or the like. The processor may implement or perform the methods, the steps, and logical block diagrams that are disclosed in the embodiments of this application. The general-purpose processor may be a microprocessor, or the processor may be any conventional processor or the like.

Figure 7:
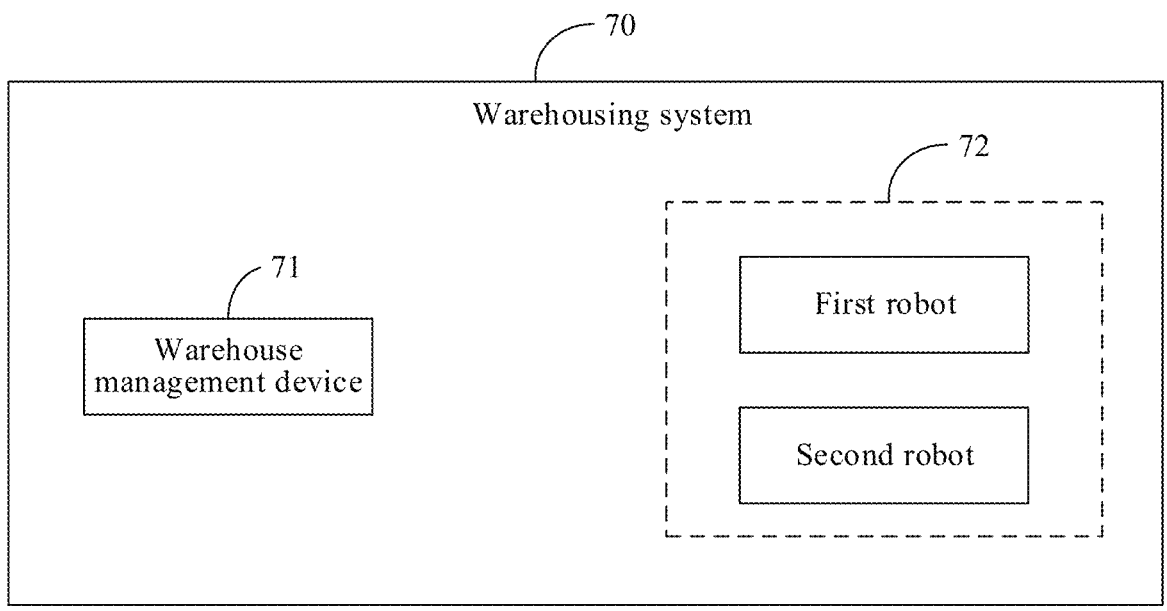
FIG. 7 is a schematic diagram of a warehousing system according to an embodiment of this application.

In some embodiments, a warehousing system is provided. FIG. 7 is a schematic diagram of a warehousing system according to an embodiment of this application. As shown in FIG. 7, the warehousing system 70 includes the warehouse management device 71 in the foregoing embodiment and robots 72 controlled by the warehouse management device. The robots 72 include first robots and second robots. The first robots are configured to convey materials loaded with materials to a conveyor line. The second robots are configured to fetch the materials handled by the workbench from the conveyor line.

In some embodiments, a computer-readable storage medium is provided. The computer-readable storage medium stores computer executable instructions, and the computer executable instructions, when executed by a processor, are configured to implement the foregoing material transferring method of the embodiment.

In some embodiments, a computer program product is provided, including a computer program, and the computer program, when executed by a processor, implements the foregoing material transferring method of the embodiment.

A person of ordinary skill in the art may understand that all or some of the procedures of the methods in the foregoing embodiments may be implemented by a computer program instructing relevant hardware. The computer program may be stored in a non-volatile computer-readable storage medium. When the program is executed, the procedures of the foregoing method embodiments may be performed. References to the memory, the storage, the database, or another medium used in the embodiments provided in this application may all include a non-volatile memory and a volatile memory. The non-volatile memory may include a ROM, a programmable ROM (PROM), an electrically programmable ROM (EPROM), an electrically erasable programmable ROM (EEPROM), or a flash memory. The volatile memory may include a random access memory (RAM) or an external high-speed cache. As an illustration instead of a limitation, the RAM is available in various forms, such as a static RAM (SRAM), a dynamic RAM (DRAM), a synchronous DRAM (SDRAM), a double data rate SDRAM (DDRSDRAM), an enhanced SDRAM (ESDRAM), a synchronization link (Synchlink) DRAM (SLDRAM), a rambus direct RAM (RDRAM), a direct rambus dynamic RAM (DRDRAM), and a rambus dynamic RAM (RDRAM).

A person skilled in the art can easily figure out another implementation solution of this application after considering the specification and practicing this application that is disclosed herein. This application is intended to cover any variations, uses, or adaptive changes of this application. These variations, uses, or adaptive changes follow the general principles of this application and include common general knowledge or common technical means in the art, which are not disclosed in this application. The specification and the embodiments are considered as merely exemplary, and the scope and spirit of the present application are pointed out in the following claims.

It is to be understood that this application is not limited to the precise structures described above and shown in the accompanying drawings, and various modifications and changes can be made without departing from the scope of this application. The scope of this application is limited by the appended claims only.

What is claimed is:

1. A material transferring method, applied to a warehouse management device, wherein a conveyor line comprises M entrances and N exits, where M≥1, N≥1, M and N are both integers; and the method comprises:

controlling a first robot transferring materials to move to a first entrance of the M entrances, the first entrance being one of the M entrances that is in an idle state; and controlling the first robot to place a first quantity of materials at the first entrance, the first quantity being less than or equal to a second quantity, the second quantity being a total quantity of materials to be placed on the conveyor line by the first robot.

2. The method according to claim 1, wherein, when the conveyor line comprises one entrance, the first quantity is equal to the second quantity.

3. The method according to claim 1, wherein the controlling a first robot transferring materials to move to a first entrance of the M entrances comprises:

determining, when the M entrances comprise at least two idle entrances, that one of the at least two idle entrances that is closest to the workbench is the first entrance; and controlling the first robot to move to the first entrance.

4. The method according to claim 1, further comprising:

before the first robot finishes placing all the materials to be placed on the conveyor line, controlling, if there is a third entrance, the first robot to move to the third entrance and place the remaining materials to be placed at a position of the third entrance;

wherein the third entrance is one of the M entrances that is in an idle state, and a distance between the third entrance and the workbench is less than that between the first entrance and the workbench.

5. The method according to claim 1, wherein, the N exits of the conveyor line are all located downstream of the M entrances in a material-conveying direction on the conveyor line, when the conveyor line comprises at least two entrances, the method further comprises:

determining the first quantity.

6. The method according to claim 5, wherein the determining the first quantity comprises:

determining that the first quantity is equal to the second quantity when the first entrance is an entrance closest to a workbench; and determining the first quantity according to a third quantity, a fourth quantity, and a fifth quantity when the first entrance is one of the M entrances except the entrance closest to the workbench;

wherein the third quantity is a quantity of materials to be placed by robots at a second entrance of the M entrances except the first entrance, and a distance between the second entrance and the workbench is less than that between the first entrance and the workbench;

the fourth quantity is a quantity of materials available for current placement on the conveyor line; and the fifth quantity is a total quantity of materials available for current fetching by robots at the N exits.

7. The method according to claim 6, wherein the determining the first quantity according to a third quantity, a fourth quantity, and a fifth quantity comprises:

obtaining the first quantity through the following formula:

$$N1=N4+N5-N3$$

where N1 denotes the first quantity, N3 denotes the third quantity, N4 denotes the fourth quantity, and N5 denotes the fifth quantity.

8. The method according to claim 1, wherein, when the conveyor line comprises at least two entrances, the method further comprises:

controlling the conveyor line to preferentially convey the materials placed by the first robot at the entrance closest to the workbench.

9. The method according to claim 8, wherein the controlling the conveyor line to preferentially convey the materials placed by the first robot at the entrance closest to the workbench comprises:

controlling the conveyor line to convey materials on a first conveying path to the workbench; and during the controlling the conveyor line to convey materials on a first conveying path to the workbench, controlling the conveyor line to suspend conveying materials on a second conveying path until there are no materials on the first conveying path or a quantity of the materials on the first conveying path is less than a maximum conveying quantity of the materials on the first conveying path;

wherein the first conveying path is a path for the conveyor line to convey, to the workbench, the materials placed by the first robots at the entrance closest to the workbench; and the second conveying path is a path for the conveyor line to convey, to the workbench, the materials placed by the first robot at one of the M entrances except the entrance closest to the workbench.

10. The method according to claim 8, wherein the controlling the conveyor line to preferentially convey the materials placed by the first robot at the entrance closest to the workbench comprises:

controlling the conveyor line to convey materials on a third conveying path to the workbench; and controlling the conveyor line to convey a sixth quantity of materials on a fourth conveying path to the workbench, the sixth quantity being less than a total quantity of materials on the fourth conveying path, the sixth quantity being determined according to a seventh quantity, an eighth quantity, and a ninth quantity;

wherein the third conveying path is a path for the conveyor line to convey the materials placed by the first robot at the entrance closest to the workbench to one of N exits;

the fourth conveying path is a path for the conveyor line to convey the materials placed by the first robot at one of the M entrances except the entrance closest to the workbench to the exit;

the seventh quantity is a total quantity of materials on the third conveying path;

the eighth quantity is a quantity of materials available for current placement on the third conveying path; and the ninth quantity is a total quantity of materials available for current fetching by robots at the N exits.

11. The method according to claim 1, wherein the method further comprises:

controlling the first robot to move to a first exit of the N exits when the first robot finishes placing all the materials to be placed on the conveyor line, the first exit being one of the N exits that is in an idle state; and controlling the first robot to fetch, at a position of the first exit, materials handled by the workbench from the conveyor line.

12. The method according to claim 11, wherein the controlling the first robot to move to a first exit of the N exits comprises:

determining, when the N exits comprise at least two idle exits, that one of the at least two idle exits that is farthest from the workbench is the first exit; and controlling the first robot to move to the first exit.

13. The method according to claim 11, further comprising:

when a quantity of materials fetched by the first robot at the position of the first exit does not reach a maximum quantity of materials stored by the first robot, if there is a second exit, controlling the first robot to move to the second exit and fetch, at a position of the second exit, materials handled by the workbench;

wherein the second exit is one of the N exits that is in an idle state, and a distance between the second exit and the workbench is greater than that between the first exit and the workbench.

14. The method according to claim 11, wherein, when the conveyor line comprises at least two exits, the method further comprises:

controlling the conveyor line to preferentially convey the materials handled by the workbench to the exit farthest from the workbench.

15. The method according to claim 11, wherein the controlling the first robot to move to a first exit of the N exits comprises:

controlling, when second robots exist at all the N exits, the second robots to leave the corresponding exits to obtain the first exit; and controlling the first robot to move to the first exit.

16. The method according to claim 15, wherein the controlling the second robots to leave the corresponding exits to obtain the first exit comprises:

controlling the second robot at the exit farthest from the workbench to leave to obtain the first exit.

17. A warehouse management device, comprising:

at least one processor; and a memory in communication connection with the at least one processor;

wherein the memory stores instructions executable by the at least one processor, the instructions, when executed by the at least one processor, causing the warehouse management device to perform operations of:

controlling a first robot transferring materials to move to a first entrance of a conveyor line, wherein the conveyor line comprises M entrances and N exits, where $M \geq 1$, $N \geq 1$, M and N are both integers, the first entrance is one of the M entrances that is in an idle state; and controlling the first robot to place a first quantity of materials at the first entrance, the first quantity being less than or equal to a second quantity, the second quantity being a total quantity of materials to be placed on the conveyor line by the first robot.

18. A warehousing system, comprising a warehouse management device and robots controlled by the warehouse management device;

the warehouse management device comprising at least one processor; and a memory in communication connection with the at least one processor; wherein the memory stores instructions executable by the at least one processor, the instructions, when executed by the at least one processor, causing the warehouse management device to perform operations of:

controlling a first robot transferring materials to move to a first entrance of a conveyor line, wherein the conveyor line comprises M entrances and N exits, where $M \geq 1$, $N \geq 1$, M and N are both integers, the first entrance is one of the M entrances that is in an idle state; and controlling the first robot to place a first quantity of materials at the first entrance, the first quantity being less than or equal to a second quantity, the second quantity being a total quantity of materials to be placed on the conveyor line by the first robot;

the robots comprising a first robot and a second robot; wherein the first robot is configured to handle materials loaded with materials to a conveyor line; and the second robot is configured to fetch materials handled by a workbench from the conveyor line.

19. A computer-readable storage medium, wherein the computer-readable storage medium stores computer-executable instructions, wherein when the computer-executable instructions are executed by a processor, the following operations is implemented:

controlling a first robot transferring materials to move to a first entrance of a conveyor line, wherein the conveyor line comprises M entrances and N exits, where $M \geq 1$, $N \geq 1$, M and N are both integers, the first entrance is one of the M entrances that is in an idle state; and controlling the first robot to place a first quantity of materials at the first entrance, the first quantity being less than or equal to a second quantity, the second quantity being a total quantity of materials to be placed on the conveyor line by the first robot.

20. A computer program product, comprising a computer program, wherein, when the computer program is executed by a processor, the following operations is implemented:

controlling a first robot transferring materials to move to a first entrance of a conveyor line, wherein the conveyor line comprises M entrances and N exits, where $M \geq 1$, $N \geq 1$, M and N are both integers, the first entrance is one of the M entrances that is in an idle state; and controlling the first robot to place a first quantity of materials at the first entrance, the first quantity being less than or equal to a second quantity, the second quantity being a total quantity of materials to be placed on the conveyor line by the first robot.

\* \* \* \* \*